(12) United States Patent
Lai

(10) Patent No.: US 12,385,731 B2
(45) Date of Patent: Aug. 12, 2025

(54) STAIR TREAD MEASURER

(71) Applicant: Jiayi Lai, Qingyuan (CN)

(72) Inventor: Jiayi Lai, Qingyuan (CN)

( * ) Notice: Subject to any disclaimer, the term of this patent is extended or adjusted under 35 U.S.C. 154(b) by 0 days.

(21) Appl. No.: 19/023,575

(22) Filed: Jan. 16, 2025

(65) Prior Publication Data

US 2025/0237489 A1    Jul. 24, 2025

(30) Foreign Application Priority Data

Jan. 23, 2024   (CN) .......................... 202420169855.6
Jul. 23, 2024   (CN) .......................... 202421761948.4

(51) Int. Cl.
*G01B 3/08*    (2006.01)

(52) U.S. Cl.
CPC ..................................... *G01B 3/08* (2013.01)

(58) Field of Classification Search
CPC ...................................................... G01B 3/08
See application file for complete search history.

(56) References Cited

U.S. PATENT DOCUMENTS

| | | | | |
|---|---|---|---|---|
| 814,530 A * | 3/1906 | Giffin | ...................... | E04F 21/26 33/461 |
| 847,720 A * | 3/1907 | Barbo | ...................... | E04F 21/26 33/462 |
| 1,205,687 A * | 11/1916 | Verhey et al. | .......... | E04F 21/26 33/462 |
| 1,253,096 A * | 1/1918 | Preston | .................... | E04F 21/26 33/461 |
| 1,489,789 A * | 4/1924 | Ryan | ....................... | E04F 21/26 33/461 |
| 1,563,229 A * | 11/1925 | Sanders | .................. | E04F 21/26 33/462 |
| 1,601,138 A * | 9/1926 | Moore | ..................... | E04F 21/26 33/462 |
| 1,624,535 A * | 4/1927 | Christianson | ........... | E04F 21/26 33/461 |
| 2,686,973 A * | 8/1954 | Christianson | .......... | G01B 3/563 33/461 |
| 3,015,164 A * | 1/1962 | Antell | ..................... | E04F 21/26 D10/64 |
| 5,440,818 A * | 8/1995 | Mailhot | ................... | B25H 7/02 33/462 |
| 6,510,616 B1 * | 1/2003 | Sparkman | ............... | E04F 21/26 33/456 |
| 2015/0233131 A1 * | 8/2015 | Hofstetter | ............... | E04F 21/26 33/427 |

* cited by examiner

*Primary Examiner* — Yaritza Guadalupe-McCall
(74) *Attorney, Agent, or Firm* — Jose Cherson Weissbrot

(57) ABSTRACT

Disclosed is a novel stair tread measurer, including connecting bases, a sliding groove, a sliding bar, a connecting block, and edge rulers. One end of one of the connecting bases is connected to the sliding bar and the other end thereof is movably connected to one of the edge rulers. One end of the other one of the connecting bases is connected to the connecting base and the other end thereof is movably connected to the other one of the edge rulers. The sliding bar is slidably connected to one side of the sliding groove. The connecting block is connected to the other side of the sliding groove.

16 Claims, 12 Drawing Sheets

STAIR TREAD MEASURER

TECHNICAL FIELD

The present disclosure relates to the technical field of measuring appliances, and in particular to a novel stair tread measurer.

BACKGROUND

Stairs, as one of the common building designs, are widely used. There are strict requirements on the size of stair treads as functional and decorative panels.

At present, there are few measuring scales specifically used for measuring the size of stair treads. During measurement, a constructor cannot measure the size of the stair treads accurately, and measuring errors are easily accumulated, which results in that the stair treads are rather big or small. If the treads are rather big, the treads need to be secondarily cut on site, which increases the extra workload for construction, thereby affecting a construction progress. If the treads are rather small, a phenomenon that sealant lines are inconsistent in width is likely to happen, which affects decorative and ornamental effects.

Moreover, there is only one fixed point between an edge ruler and a sliding groove of an existing stair tread measurer, and the stair tread measurer is likely to loosen in a using process.

SUMMARY

To overcome deficiencies in the prior art, the present disclosure aims to provide a novel stair tread measurer. By moving a sliding bar in a sliding groove, outer sides of edge rulers abut against both sides of a stair. After the edge rulers are positioned, a length and a width of a tread can be determined by an area enclosed by the outer sides of the edge rulers on both sides, the sliding groove, and an outer side of the sliding bar. The measurer is transferred to the tread to cut a size of the tread precisely. Moreover, through a magnetic limiting block, when the measurer is transferred to the tread, the measurer can be fixed to the tread more conveniently. Moreover, an arc-shaped groove is further formed in a connecting base, which is equivalent to additionally arranging a fixed point, so that the edge rulers are unlikely to loosen. The edge rulers also can change in terms of angle along the arc-shaped groove, so that a function of the present disclosure is enriched.

In order to achieve the above objective, the present disclosure adopts the following technical solution:

A novel stair tread measurer, including a connecting base, a sliding groove, a sliding bar, a connecting block, and an edge ruler, where one end of one of the connecting bases is connected to the sliding bar and the other end thereof is movably connected to one of the edge rulers; one end of the other one of the connecting bases is connected to the connecting block and the other end thereof is movably connected to the other one of the edge rulers; the sliding bar is slidably connected to one side of the sliding groove; and the connecting block is connected to the other side of the sliding groove.

It should be noted that a through hole is formed in one end of the sliding bar, and a first guide groove is formed at a bottom of the sliding groove; and the novel stair tread measurer further includes a fastening screw, the fastening screw penetrating through the through hole and stretching outside the first guide groove.

It should be noted that the novel stair tread measurer further includes a limiting block, where each of the connecting bases is provided with a pair of insertion connection grooves; and during use, one end of the limiting block is connected in the insertion connection grooves.

It should be noted that each of the connecting bases is further provided with a storage area, and in a normal state, the limiting block is placed in the storage area.

It should be noted that a magnetic part is arranged in the limiting block, and another magnetic part magnetically connected to the magnetic part is arranged on an outer surface of each of the insertion connection grooves.

It should be noted that a magnetic part is arranged in the storage area, and in a normal state, the limiting block is magnetically absorbed in the storage area.

It should be noted that each of the edge rulers is provided with a second guide groove, a via hole is formed in the other end of each of the connecting bases, and a fastening screw penetrates through the via hole and stretches outside the second guide groove.

It should be noted that the sliding groove further has different replaceable length dimensions.

Based on the above structure, the present disclosure further provides a variation of another technical solution:

A novel stair tread measurer, including a connecting base, a sliding groove, a sliding bar, and an edge ruler, where one end of the connecting base is connected to the sliding bar and the other end thereof is movably connected to the edge ruler, and the sliding bar is slidably connected in the sliding groove; and an arc-shaped groove is formed in the other end of the connecting base, and the edge ruler is configured to swing along the arc-shaped groove.

It should be noted that a through hole is formed in one end of the sliding bar, and a first guide groove is formed at a bottom of the sliding groove; and the novel stair tread measurer further includes a fastening screw, the fastening screw penetrating through the through hole and stretching outside the first guide groove.

It should be noted that the edge ruler is provided with a second guide groove, and when the connecting base is connected to the edge ruler, a fastening screw penetrates through the arc-shaped groove and stretches outside the second guide groove.

It should be noted that a via hole is formed in the other end of the connecting base, and the fastening screw penetrates through the via hole and stretches outside the second guide groove.

It should be noted that the novel stair tread measurer further includes a limiting block, where the connecting base is provided with an insertion connection groove; and during use, one end of the limiting block is connected in the insertion connection groove.

It should be noted that each of the connecting bases is further provided with a storage area, and in a normal state, the limiting block is placed in the storage area.

It should be noted that a magnetic part is arranged in the limiting block, and another magnetic part magnetically connected to the magnetic part is arranged on an outer surface of each of the insertion connection grooves.

It should be noted that a magnetic part is arranged in the storage area, and in a normal state, the limiting block is magnetically absorbed in the storage area.

Based on the above structure, the present disclosure further provides a variation of yet another technical solution:

A novel stair tread measurer, including a connecting base, a sliding groove, a sliding bar, and an edge ruler, where one end of the connecting base is connected to the sliding bar and the other end thereof is movably connected to the edge ruler, and the sliding bar is slidably connected in the sliding groove.

It should be noted that a through hole is formed in one end of the sliding bar, and a first guide groove is formed at a bottom of the sliding groove; and the novel stair tread measurer further includes a fastening screw, the fastening screw penetrating through the through hole and stretching outside the first guide groove.

It should be noted that the novel stair tread measurer further includes a limiting block, where the connecting base is provided with a pair of insertion connection grooves; during use, one end of the limiting block is connected in the insertion connection grooves; and a magnetic part is arranged in the limiting block, and another magnetic part magnetically connected to the magnetic part is arranged on an outer surface of each of the insertion connection grooves.

It should be noted that the connecting base is further provided with a storage area, and in a normal state, the limiting block is placed in the storage area; and a magnetic part is arranged in the storage area, and in a normal state, the limiting block is magnetically absorbed in the storage area.

It should be noted that each of the edge rulers is provided with a second guide groove, a via hole is formed in the other end of each of the connecting bases, and the fastening screw penetrates through the via hole and stretches outside the second guide groove.

It should be noted that the sliding groove further has different replaceable length dimensions.

The present disclosure has the following beneficial effects: the novel stair tread measurer is simple in structure and convenient to use; the length and the width of a tread can be accurately measured as the edge rulers, the sliding groove, and the sliding bar are matched, so that an error is avoided to a maximum extent; and through a magnetic limiting block, the limiting block is conveniently used. In addition, through an arc-shaped groove structure, in addition to effectively fix the edge rulers to prevent the edge rulers from loosening, the edge rulers swing along the arc-shaped groove, so that the edge rulers can be fixed at different angles.

DETAILED DESCRIPTION

The present disclosure will be further described below in conjunction with accompanying drawings. It should be noted that based on the premise of the technical solution, the present disclosure provides detailed embodiments and specific operating processes. However, the protection scope of the present disclosure is not limited to the embodiments.

Figure 1:
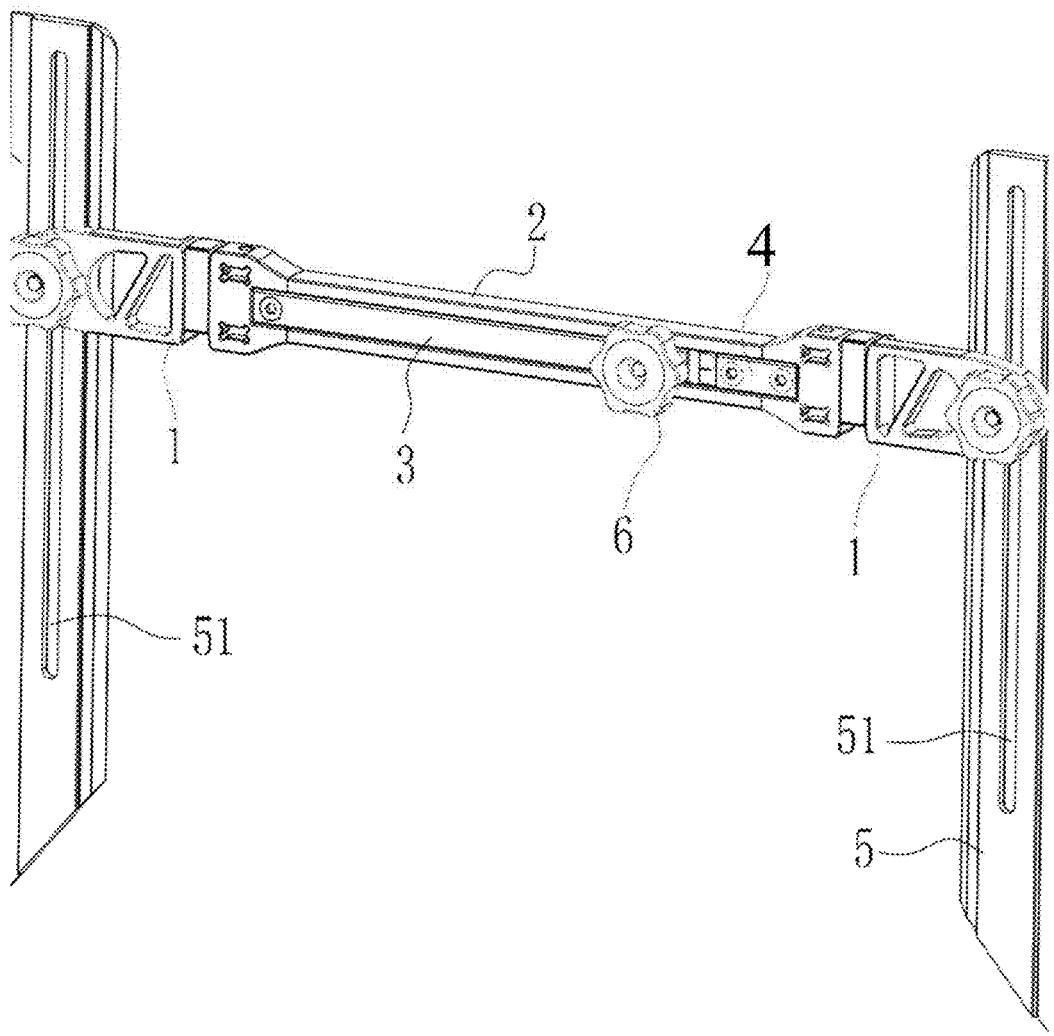
FIG. 1 is a schematic structural diagram of the present disclosure.
Figure 2:
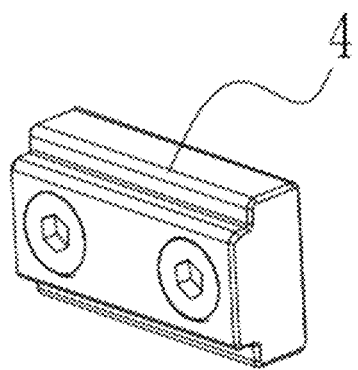
FIG. 2 is a schematic structural diagram of a connecting block in FIG. 1.

A first solution of the present disclosure is as follows:

As shown in FIG. 1 and FIG. 2, the present disclosure provides a novel stair tread measurer, including a connecting base 1, a sliding groove 2, a sliding bar 3, a connecting block 4, and an edge ruler 5, where one end of one of the connecting bases 1 is connected to the sliding bar 3 and the other end thereof is movably connected to one of the edge rulers 5; one end of the other one of the connecting bases 1 is connected to the connecting block 4 and the other end thereof is movably connected to the other one of the edge rulers 5; the sliding bar 3 is slidably connected to one side of the sliding groove 2; and the connecting block 4 is connected to the other side of the sliding groove 2.

Figure 3:
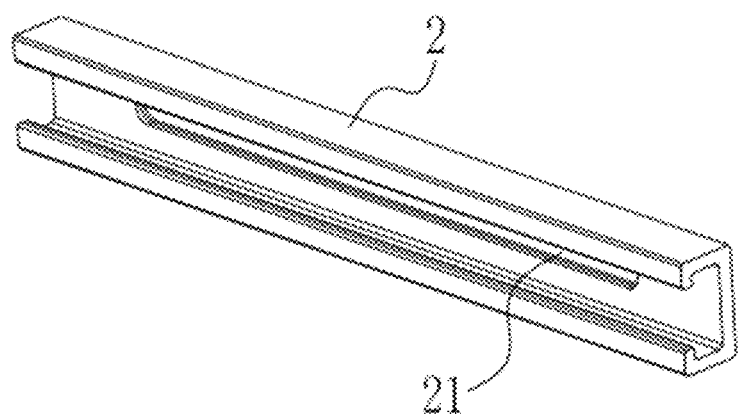
FIG. 3 is a schematic structural diagram of a sliding groove in FIG. 1.
Figure 4:
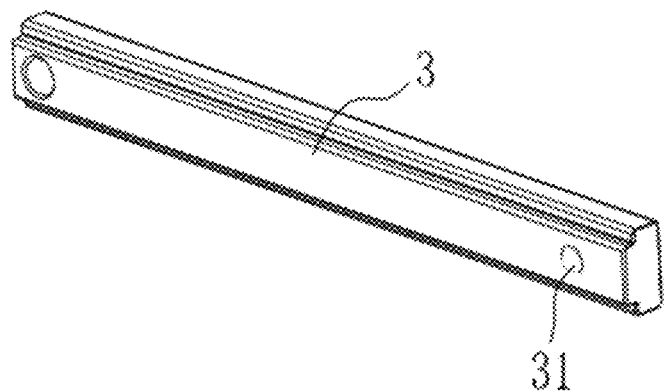
FIG. 4 is a schematic structural diagram of a sliding bar in FIG. 1.

Further, as shown in FIG. 1, FIG. 3, and FIG. 4, a through hole 31 is formed in one end of the sliding bar 3 in the present disclosure, and a first guide groove 21 is formed at a bottom of the sliding groove 2; and the novel stair tread measurer further includes a fastening screw 6, and the fastening screw 6 penetrates through the through hole 31 and stretches outside the first guide groove 21.

Figure 5:
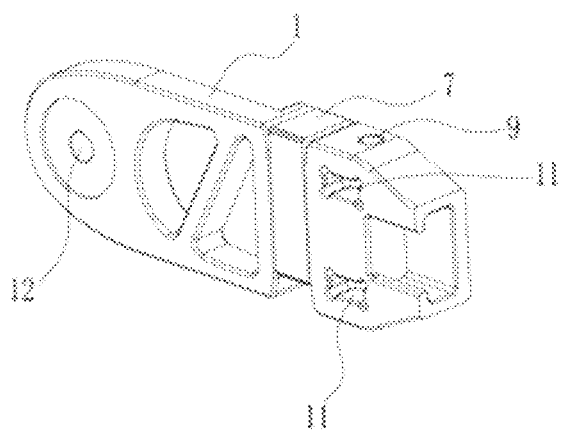
FIG. 5 is a schematic structural diagram of a connecting base in FIG. 1.
Figure 6:
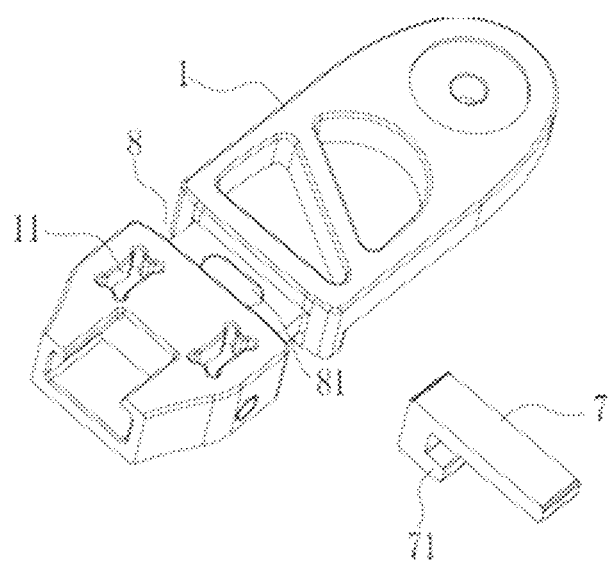
FIG. 6 is a schematic structural diagram of a limiting block and a connecting base in the present disclosure.

Further, as shown in FIG. 5 and FIG. 6, the novel stair tread measurer further includes a limiting block 7, where the connecting base 1 is provided with a pair of insertion connection grooves 11; and during use, one end 71 of the limiting block 7 is connected in the insertion connection grooves 11.

Further, as shown in FIG. 6, the connecting base 1 in the present disclosure is further provided with a storage area 8, and in a normal state, the limiting block 7 is placed in the storage area 8.

Further, as shown in FIG. 5, a magnetic part is arranged in the limiting block 7 in the present disclosure, and another magnetic part 9 magnetically connected to the magnetic part is arranged on an outer surface of each of the insertion connection grooves 11.

Further, as shown in FIG. 6, a magnetic part 81 is arranged in the storage area 8 in the present disclosure, and in a normal state, the limiting block 7 is magnetically absorbed in the storage area 8.

Further, as shown in FIG. 1 and FIG. 5, the edge ruler 5 is provided with a second guide groove 51, a via hole 12 is formed in the other end of the connecting base 1, and the fastening screw 6 penetrates through the via hole 12 and stretches outside the second guide groove 51.

Further, the sliding groove 2 in the present disclosure further has different replaceable length dimensions to fit different stair dimensions.

A second solution of the present disclosure is as follows:

As another variation of the technical solution of the present disclosure, an arc-shaped groove 13 can be further formed in a connecting base 1, which is equivalent to additionally arranging a fixed point, so that edge rulers 5 are unlikely to loosen. The edge rulers 5 also can change in terms of angle along an arc-shaped groove 13.

Figure 7:
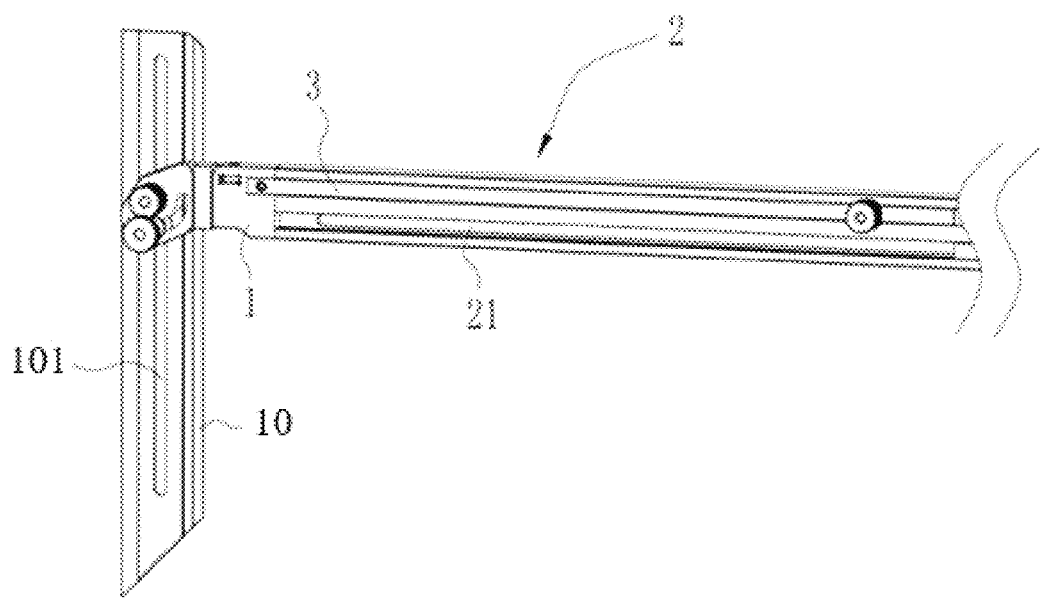
FIG. 7 is a schematic diagram of a structure (partial) of another technical solution of the present disclosure.
Figure 8:
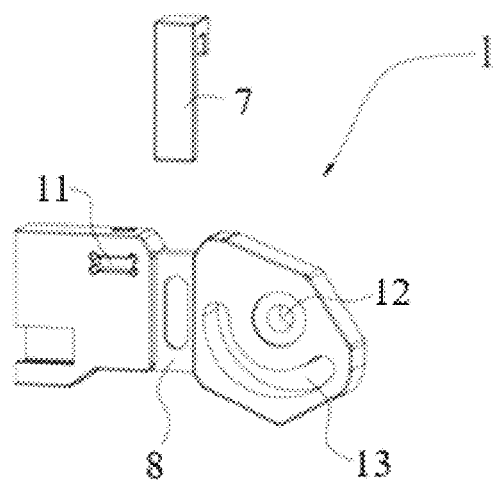
FIG. 8 is a schematic structural diagram of the connecting base in FIG. 7.

As shown in FIG. 7 and FIG. 8, the present disclosure provides a novel stair tread measurer, including a connecting base 1, a sliding groove 2, a sliding bar 3, and a type ruler 10, where one end of the connecting base 1 is connected to the sliding bar 3 and the other end thereof is movably connected to the type ruler 10, and the sliding bar 3 is slidably connected in the sliding groove 2; an arc-shaped groove 13 is formed in the other end of the connecting base 1, and the type ruler 10 is configured to swing along the arc-shaped groove 13.

Figure 9:
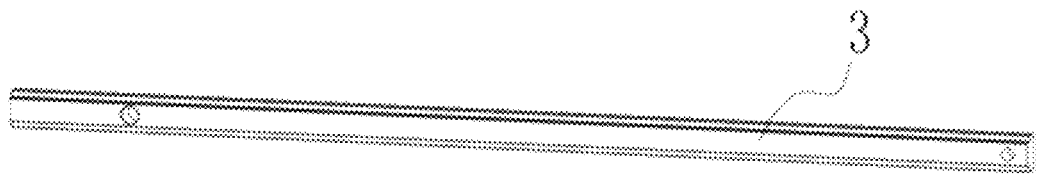
FIG. 9 is a schematic structural diagram of a sliding bar in FIG. 7.

Further, as shown in FIG. 7 and FIG. 9, a through hole 31 is formed in one end of the sliding bar 3 in the present disclosure, and a first guide groove 21 is formed at a bottom of the sliding groove 2; and the novel stair tread measurer further includes a fastening screw 6, and the fastening screw 6 penetrates through the through hole 31 and stretches outside the first guide groove 21.

Further, as shown in FIG. 7, the type ruler 10 in the present disclosure is provided with a second guide groove 101. When the connecting base 1 is connected to the type ruler 10, the fastening screw 6 penetrates through the arc-shaped groove 13 and stretches outside the second guide groove 101.

Further, as shown in FIG. 8, a via hole 12 is further formed in the other end of the connecting base 1 in the present disclosure, and the fastening screw 6 penetrates through the via hole 12 and stretches outside the second guide groove 101.

Further, as shown in FIG. 8, the novel stair tread measurer provided by the present disclosure further includes a limiting block 7, where the connecting base 1 is provided with an insertion connection grooves 11; and during use, one end 71 of the limiting block 7 is connected in the insertion connection groove 11.

Further, as shown in FIG. 8, the connecting base 1 in the present disclosure is further provided with a storage area 8, and in a normal state, the limiting block 7 is placed in the storage area 8.

Further, a magnetic part is arranged in the limiting block 7 in the present disclosure, and another magnetic part 9 magnetically connected to the magnetic part is arranged on an outer surface of the insertion connection groove 11.

Further, a magnetic part 81 is arranged in the storage area 8 in the present disclosure, and in a normal state, the limiting block 7 is magnetically absorbed in the storage area 8.

Figure 10:
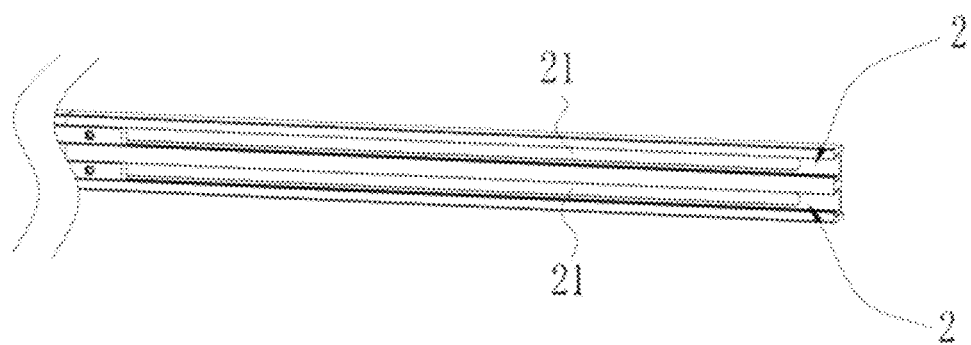
FIG. 10 is a schematic diagram of a sliding groove structure (partial) in FIG. 7.
Figure 11:
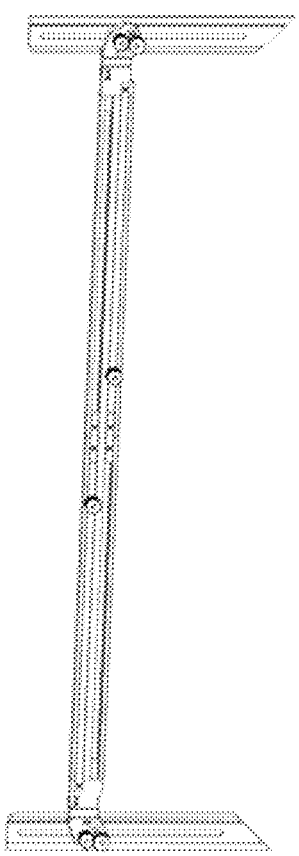
FIG. 11 is a schematic diagram of an overall structure of another technical solution of the present disclosure.

It should be pointed out that as a preferred technical solution, as shown in FIG. 10, in the present disclosure, upper and lower sliding grooves 2 can be respectively formed. When the sliding bars 3 are slidably connected in the sliding grooves 2, one of the sliding bars 3 can slide arbitrarily, and the sliding bars 3 will not interfere with each other. Further, a number of the first guide grooves 21 should correspond to a number of the sliding grooves 2.

Figure 12:
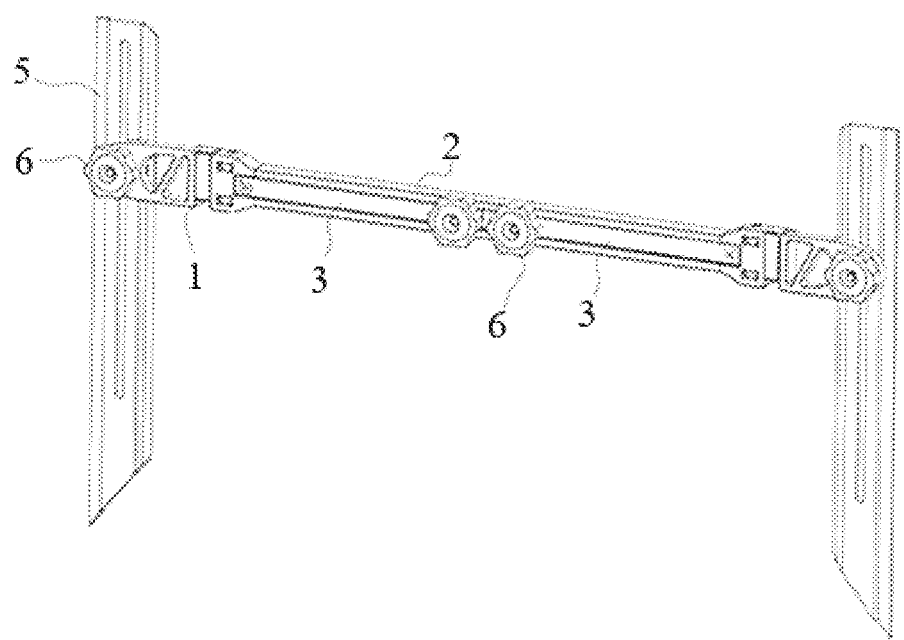
FIG. 12 is a schematic diagram of a structure of a technical solution of the present disclosure.

A third solution of the present disclosure is as follows:
As a variation of the first solution of the present disclosure, the connecting block structure can be removed, so that the connecting base 1 is directly connected to the sliding bar 3, and the rest of structures is similar to the structures in the first solution, specifically as follows:
As shown in FIG. 12, the present disclosure provides a novel stair tread measurer, including a connecting base 1, a sliding groove 2, a sliding bar 3, and an edge ruler 5, where one end of the connecting base 1 is connected to the sliding bar 3, and the other end thereof is movably connected to the edge ruler 5, and the sliding bar 3 is slidably connected in the sliding groove 2.

Further, as shown in FIG. 12, a through hole 31 is formed in one end of the sliding bar 3 in the present disclosure, and a first guide groove 21 is formed at a bottom of the sliding groove 2; and the novel stair tread measurer further includes a fastening screw 6, and the fastening screw 6 penetrates through the through hole 31 and stretches outside the first guide groove 21.

Further, the novel stair tread measurer provided by the present disclosure further includes a limiting block 7, where the connecting base 1 is provided with a pair of insertion connection grooves 11; during use, one end 71 of the limiting block 7 is connected in the insertion connection grooves 11; and a magnetic part is arranged in the limiting block 7, and another magnetic part 9 magnetically connected to the magnetic part is arranged on an outer surface of each of the insertion connection grooves 11.

Further, the connecting base 1 in the present disclosure is further provided with a storage area 8, and in a normal state, the limiting block 7 is placed in the storage area 8; and the magnetic part 81 is arranged in the storage area 8, and in a normal state, the limiting block 7 is magnetically absorbed in the storage area 8.

Further, the edge ruler 5 in the present disclosure is provided with a second guide groove 51, a via hole 12 is formed in the other end of the connecting base 1, and the fastening screw 6 penetrates through the via hole 12 and stretches outside the second guide groove 51.

Further, the sliding groove 2 in the present disclosure further has different replaceable length dimensions.

Embodiment 1

During use, by adjusting a position of a sliding bar 3 in a sliding groove 2, a length of the present disclosure can fit different stairs till edge rulers 5 on both sides abut against both sides of the stair. Further, by adjusting up-down distances of the edge rulers 5, a width of the stair can be determined. After the adjustment, the length and the width of the stair can be determined by an area enclosed by outer sides of the edge rulers 5 on both sides, the sliding groove 2, and outer side of the sliding bar 3, and then a measurer is moved to a tread material. To fix the measurer on the tread material, a limiting block 7 on a connecting base 1 can be taken down and inserted into an insertion connection groove 11 in the connecting base 1, and the limiting block 7 abuts against one side of the stair tread, so as to prevent the measurer from displacing. Finally, the stair tread is cut according to a measured dimension to obtain a precise stair tread.

Embodiment 2

During use, this embodiment is basically consistent with the Embodiment 1. By adjusting the position of the sliding bar 3 in the sliding groove 2, the length of the present disclosure can fit different stairs till type rulers 10 on both sides abut against both sides of the stair. Further, by adjusting the up-down distances of the type rulers 10, the width of the stair can be determined. After the adjustment, the length and the width of the stair can be determined by an area enclosed by outer sides of the type rulers 10 on both sides, the sliding groove 2, and the outer side of the sliding bar 3, and then the measurer is moved to the tread material. To fix the measurer on the tread material, the limiting block 7 on the connecting base 1 can be taken down and inserted into the insertion connection groove 11 in the connecting base 1, and the limiting block 7 abuts against one side of the stair tread, so as to prevent the measurer from displacing. Finally, the stair tread is cut according to a measured dimension to obtain a precise stair tread.

In addition, since an arc-shaped groove 13 is formed in the connecting base 1 in the embodiment and besides having a function of adjusting an angle of the type ruler 10, the arc-shaped groove 13 is equivalent to a fixed point importantly, which avoids a condition of inaccurate measurement due to loosening of the type ruler 10.

Embodiment 3

During use, this embodiment is basically consistent with the Embodiment 1. By adjusting the position of the sliding bar 3 in the sliding groove 2, the length of the present disclosure can fit different stairs till the edge rulers 5 on both sides abut against both sides of the stair. Further, by adjusting the up-down distances of the edge rulers 5, the width of the stair can be determined. After the adjustment, the length and the width of the stair can be determined by an area enclosed by the outer sides of the edge rulers 5 on both sides, the sliding groove 2, and the outer side of the sliding bar 3, and then the measurer is moved to the tread material. To fix the measurer on the tread material, the limiting block 7 on the connecting base 1 can be taken down and inserted into the insertion connection groove 11 in the connecting base 1, and the limiting block 7 abuts against one side of the stair tread, so as to prevent the measurer from displacing. Finally, the stair tread is cut according to a measured dimension to obtain a precise stair tread.

Persons skilled in the art can make various corresponding changes and transformations according to the above technical solution and concept, and all the changes and transformations shall fall within the protection scope of the claims of the present disclosure.

What is claimed is:

1. A novel stair tread measurer, comprising a connecting base, a sliding groove, a sliding bar, a connecting block, a limiting block and an edge ruler, wherein one end of one of the connecting bases is connected to the sliding bar and the other end thereof is movably connected to one of the edge rulers; one end of the other one of the connecting bases is connected to the connecting block and the other end thereof is movably connected to the other one of the edge rulers; the sliding bar is slidably connected to one side of the sliding groove; the connecting block is connected to the other side of the sliding groove; wherein each of the connecting bases is provided with a pair of insertion connection grooves; and during use, one end of the limiting block is connected in the insertion connection grooves.

2. The novel stair tread measurer according to claim 1, wherein a through hole is formed in one end of the sliding bar, and a first guide groove is formed at a bottom of the sliding groove; and the novel stair tread measurer further comprises a fastening screw, the fastening screw penetrating through the through hole and stretching outside the first guide groove.

3. The novel stair tread measurer according to claim 1, wherein each of the connecting bases is further provided with a storage area, and in a normal state, the limiting block is placed in the storage area.

4. The novel stair tread measurer according to claim 3, wherein a magnetic part is arranged in the storage area, and in a normal state, the limiting block is magnetically absorbed in the storage area.

5. The novel stair tread measurer according to claim 1, wherein a magnetic part is arranged in the limiting block, and another magnetic part magnetically connected to the magnetic part is arranged on an outer surface of each of the insertion connection grooves.

6. The novel stair tread measurer according to claim 1, wherein each of the edge rulers is provided with a second guide groove, a via hole is formed in the other end of each of the connecting bases, and a fastening screw penetrates through the via hole and stretches outside the second guide groove.

7. The novel stair tread measurer according to claim 1, wherein the sliding groove further has different replaceable length dimensions.

8. A novel stair tread measurer, comprising a connecting base, a sliding groove, a sliding bar, and an edge ruler, wherein one end of the connecting base is connected to the sliding bar and the other end thereof is movably connected to the edge ruler, and the sliding bar is slidably connected in the sliding groove; and an arc-shaped groove is formed in the other end of the connecting base, the edge ruler is configured to swing along the arc-shaped groove; wherein the edge ruler is provided with a second guide groove, and when the connecting base is connected to the edge ruler, a fastening screw penetrates through the arc-shaped groove and stretches outside the second guide groove; wherein a via hole is formed in the other end of the connecting base, and the fastening screw penetrates through the via hole and stretches outside the second guide groove.

9. The novel stair tread measurer according to claim 8, wherein a through hole is formed in one end of the sliding bar, and a first guide groove is formed at a bottom of the sliding groove; and the novel stair tread measurer further comprises a fastening screw, the fastening screw penetrating through the through hole and stretching outside the first guide groove.

10. The novel stair tread measurer according to claim 8, further comprising a limiting block, wherein each of the connecting bases is provided with an insertion connection groove; and during use, one end of the limiting block is connected in the insertion connection groove.

11. The novel stair tread measurer according to claim 10, wherein each of the connecting bases is further provided with a storage area, and in a normal state, the limiting block is placed in the storage area.

12. The novel stair tread measurer according to claim 10, wherein a magnetic part is arranged in the limiting block, and another magnetic part magnetically connected to the magnetic part is arranged on an outer surface of each of the insertion connection grooves.

13. The novel stair tread measurer according to claim 12, wherein a magnetic part is arranged in the storage area, and in a normal state, the limiting block is magnetically absorbed in the storage area.

14. A novel stair tread measurer, comprising a connecting base, a sliding groove, a sliding bar, a limiting block and an edge ruler, wherein one end of the connecting base is connected to the sliding bar and the other end thereof is movably connected to the edge ruler, the sliding bar is slidably connected in the sliding groove; wherein the connecting base is provided with a pair of insertion connection grooves; during use, one end of the limiting block is connected in the insertion connection grooves; and a magnetic part is arranged in the limiting block, and another magnetic part magnetically connected to the magnetic part is arranged on an outer surface of each of the insertion connection grooves.

15. The novel stair tread measurer according to claim 14, wherein a through hole is formed in one end of the sliding bar, and a first guide groove is formed at the bottom of the sliding groove; and the novel stair tread measurer further comprises a fastening screw, the fastening screw penetrating through the through hole and stretching outside the first guide groove.

16. The novel stair tread measurer according to claim 14, wherein the connecting base is further provided with a storage area, and in a normal state, the limiting block is placed in the storage area; and a magnetic part is arranged in the storage area, and in a normal state, the limiting block is magnetically absorbed in the storage area.

* * * * *